(12) United States Patent
Toyoshima

(10) Patent No.: US 9,543,572 B2
(45) Date of Patent: Jan. 10, 2017

(54) NON-AQUEOUS ELECTROLYTE SECONDARY BATTERY

(75) Inventor: Ippei Toyoshima, Toyota (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/417,975

(22) PCT Filed: Aug. 1, 2012

(86) PCT No.: PCT/JP2012/069617
§ 371 (c)(1),
(2), (4) Date: Jan. 28, 2015

(87) PCT Pub. No.: WO2014/020729
PCT Pub. Date: Feb. 6, 2014

(65) Prior Publication Data
US 2015/0194655 A1    Jul. 9, 2015

(51) Int. Cl.
*H01M 4/131* (2010.01)
*H01M 10/052* (2010.01)
*H01M 4/485* (2010.01)
*H01M 4/505* (2010.01)
*H01M 4/525* (2010.01)
*H01M 10/0569* (2010.01)
*H01M 10/0525* (2010.01)
*H01M 2/16* (2006.01)

(52) U.S. Cl.
CPC ........... *H01M 4/131* (2013.01); *H01M 2/1686* (2013.01); *H01M 4/485* (2013.01); *H01M 4/505* (2013.01); *H01M 4/525* (2013.01); *H01M 10/052* (2013.01); *H01M 10/0525* (2013.01); *H01M 10/0569* (2013.01); *H01M 2/1653* (2013.01); *H01M 2220/20* (2013.01); *H01M 2300/0034* (2013.01); *Y02E 60/122* (2013.01); *Y02T 10/7011* (2013.01)

(58) Field of Classification Search
CPC ...... H01M 4/131; H01M 4/505; H01M 4/525; H01M 10/052; H01M 10/0525; H01M 10/0569; H01M 2/1686; H01M 2/1653; H01M 2220/20; H01M 2300/0034; Y02E 60/122

See application file for complete search history.

(56) References Cited

U.S. PATENT DOCUMENTS

| 5,962,166 A * | 10/1999 | Ein-Eli ................. H01M 4/505 423/599 |
| 6,322,929 B1 * | 11/2001 | Takada ................. H01M 4/131 429/223 |
| 2008/0206652 A1 | 8/2008 | Abe et al. |
| 2009/0104510 A1 | 4/2009 | Fulop et al. |
| 2009/0325057 A1 | 12/2009 | Kim et al. |
| 2011/0081578 A1 | 4/2011 | Chang et al. |
| 2012/0164511 A1 | 6/2012 | Wu et al. |

FOREIGN PATENT DOCUMENTS

| CN | 101479877 A | 7/2009 |
| JP | 2001-052704 A | 2/2001 |
| JP | 2001-210325 A | 8/2001 |
| JP | 2002-151078 A | 5/2002 |
| JP | 2007-305352 A | 11/2007 |
| JP | 2008-205355 A | 9/2008 |
| JP | 2008-210573 A | 9/2008 |
| JP | 2010-539657 A | 12/2010 |
| JP | 2012-059486 A | 3/2012 |
| JP | 2012-138359 A | 7/2012 |
| KR | 20070108084 A | 11/2007 |

OTHER PUBLICATIONS

International Search Report of PCT/JP2012/069617 dated Oct. 2, 2012 [PCT/ISA/210].

* cited by examiner

Primary Examiner — Laura Weiner
(74) Attorney, Agent, or Firm — Sughrue Mion, PLLC

(57) ABSTRACT

The present invention provides a non-aqueous electrolyte secondary battery that comprises an electrode body comprising a positive electrode and a negative electrode. The positive electrode has an upper operating voltage limit of 4.5 V or higher relative to lithium metal. The electrode body comprises a lithium titanate-containing layer. The lithium titanate-containing layer is isolated from the negative electrode.

10 Claims, 5 Drawing Sheets

NON-AQUEOUS ELECTROLYTE SECONDARY BATTERY

CROSS REFERENCE TO RELATED APPLICATIONS

This application is a National Stage of International Application No. PCT/JP2012/069617, filed Aug. 1, 2012, the contents of which are incorporated herein by reference in its entirety.

TECHNICAL FIELD

The present invention relates to a non-aqueous electrolyte secondary battery, in particular, a lithium secondary battery and other non-aqueous electrolyte secondary batteries applicable to power supplies installed in vehicles.

BACKGROUND ART

Secondary batteries such as lithium secondary batteries, nickel hydrogen batteries and the like are used as power supplies installed in electrically driven vehicles or as batteries installed in electric devices such as PCs, mobile devices, etc. In particular, lithium-ion secondary batteries that are lightweight, yet have high energy densities as well as other non-aqueous electrolyte secondary batteries are suitable as high-power power supplies installed in vehicles such as electric automobiles, hybrid automobiles and the like. From such a non-aqueous electrolyte secondary battery, greater properties such as a higher energy density and so on are demanded. For example, Document 1 provides a non-aqueous electrolyte secondary battery using a positive electrode active material that exhibits an operating voltage above 4.3 V relative to lithium metal.

CITATION LIST

Patent Literature

[Patent Document 1] Japanese Patent Application Publication No. 2008-210573

SUMMARY OF INVENTION

Technical Problem

As suggested in the conventional art, the use of a positive electrode active material that operates at a higher voltage can be effective in obtaining a higher energy density. However, with the positive electrode active material operating at a higher voltage, charging and discharging cycles at high voltages may cause dissolution of metal(s) constituting the positive electrode active material. Especially, when the battery is subjected to repeated charging and discharging with the charging being provided until the positive electrode reaches a voltage of 4.5 V or higher relative to lithium metal (a voltage relative to lithium metal may be expressed with "vs. Li/Li$^+$" hereinafter), the tendency of metal dissolution from positive electrode may increase, and the dissolved metal may precipitate out on the negative electrode, causing battery capacity reduction.

The present invention relates to improving a non-aqueous electrolyte secondary battery using a positive electrode that has a high upper operating voltage limit, with an objective thereof being to provide a non-aqueous electrolyte secondary battery with which battery capacity reduction can be inhibited.

Solution to Problem

To achieve the objective, the present invention provides a non-aqueous electrolyte secondary battery that comprises an electrode body comprising a positive electrode and a negative electrode. The positive electrode has an upper operating voltage limit of 4.5 V or higher relative to lithium metal. The electrode body comprises a lithium titanate-containing layer. The lithium titanate-containing layer is isolated from the negative electrode.

According to such a constitution, the lithium titanate-containing layer isolated from the negative electrode captures the metal dissolved from the positive electrode. This inhibits the metal from precipitating out on the negative electrode and suppresses battery capacity reduction. It has been found that the capacity loss rather increases when the lithium titanate-containing layer is in contact with the negative electrode.

In a preferable embodiment of the non-aqueous electrolyte secondary battery disclosed herein, the positive electrode comprises, as a positive electrode active material, a spinel lithium transition metal composite oxide; and the lithium transition metal composite oxide comprises at least nickel and manganese as transition metals. Since this positive electrode active material has a high operating voltage, a secondary battery constituted with the positive electrode active material can be charged to a higher voltage. Thus, it tends to be more susceptible to the occurrence of dissolution of a transition metal (typically manganese (Mn)) from the positive electrode caused by high-voltage charge and discharge accompanying precipitation of the dissolved metal on the negative electrode. A constitution using such a positive electrode active material will preferably benefit from the effect by this invention, that is, the effect to capture the dissolved transition metal before it reaches the negative electrode and thereby to inhibit battery capacity reduction.

In a preferable embodiment of the non-aqueous electrolyte secondary battery disclosed herein, the lithium titanate-containing layer is placed between the positive electrode and the negative electrode. This allows lithium titanate to preferably capture the metal dissolved out from the positive electrode before it reaches the negative electrode. In particular, it is preferable that a separator is placed between the positive electrode and the negative electrode, with the lithium titanate-containing layer being provided on the positive electrode side surface of the separator.

In a preferable embodiment of the non-aqueous electrolyte secondary battery disclosed herein, the lithium titanate-containing layer comprises 50% by mass or more lithium titanate. This allows the lithium titanate-containing layer to preferably capture the metal.

In a preferable embodiment of the non-aqueous electrolyte secondary battery disclosed herein, the lithium titanate-containing layer has a thickness of 5 μm to 15 μm. An excessively thin lithium titanate-containing layer will lead to reduced metal capturing capability as well as a tendency of reduced strength of the layer itself. An excessively thick lithium titanate-containing layer may result in a poorer battery property such as a lower energy density, etc.

In a preferable embodiment of the non-aqueous electrolyte secondary battery disclosed herein, the non-aqueous electrolyte secondary battery is constituted with a non-aqueous electrolyte solution comprising a fluorinated carbonate. When the secondary battery is charged to 4.5 V or higher, the non-aqueous electrolyte solution tends to be more susceptible to oxidative decomposition. The use of a non-aqueous electrolyte solution comprising a highly acid-resistant fluorinated carbonate in such a secondary battery will inhibit oxidative decomposition of the non-aqueous electrolyte solution. Such a non-aqueous electrolyte solution is preferable for use in a secondary battery using a positive electrode with an upper operating voltage limit of 4.5 V or higher (vs. Li/Li$^+$).

In the non-aqueous electrolyte secondary battery disclosed herein, battery capacity reduction is inhibited. Accordingly, with the benefit of this feature, it can be preferably used as a driving power supply in a vehicle such as a hybrid vehicle (HV), plug-in hybrid vehicle (PHV), electric vehicle (EV) and the like. In other words, the present invention provides a vehicle comprising a non-aqueous electrolyte secondary battery disclosed herein (which may be in a form of a battery system wherein several batteries are connected).

DESCRIPTION OF EMBODIMENTS

Figure 1:
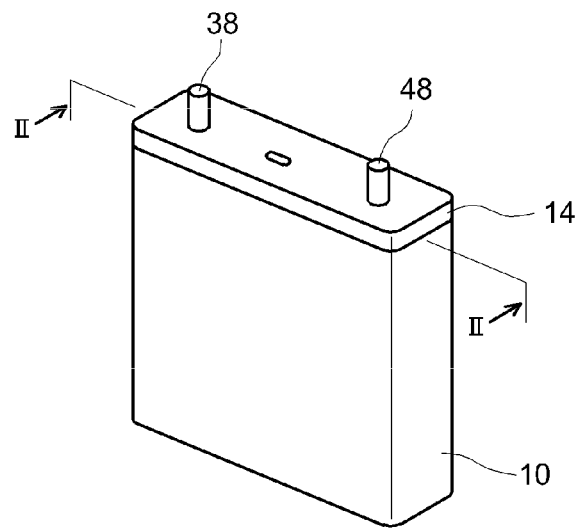
FIG. 1 shows a perspective view schematically illustrating the appearance of the lithium secondary battery according to an embodiment.

While referring to drawings, an embodiment of the present invention is described below. The dimensional relationships (of length, width, thickness, etc.) in each drawing do not represent actual dimensional relationships. Matters (e.g. constitution and manufacturing process of the electrode body comprising the positive electrode and the negative electrode, constitutions and manufacturing processes of the separator, the shape, etc., of the battery (case), general techniques related to construction of the battery, etc.) necessary to practice this invention other than those specifically referred to in this description may be understood as design matters based on the conventional art in the pertinent field to a person of ordinary skills in the art. The present invention can be practiced based on the contents disclosed in this description and common technical knowledge in the subject field. In the drawings referenced below, a common reference numeral may be assigned to members or sites producing the same effect, and duplicated descriptions are sometimes omitted or simplified.

As a preferable embodiment related to the non-aqueous electrolyte secondary battery disclosed herein, a lithium secondary battery is described as an example although applications of the present invention are not to be limited to lithium secondary batteries.

In this description, the term "secondary battery" refers to a rechargeable battery in general and includes storage batteries such as lithium secondary batteries. The term "non-aqueous electrolyte secondary battery" in this description refers to a battery comprising a non-aqueous electrolyte solution (typically an electrolyte solution containing a supporting salt in a non-aqueous solvent). The term "lithium secondary battery" in this description refers to a secondary battery that uses lithium ions (Li ions) as electrolytic ions and charges and discharges by means of transfer of charges associated with Li ions between the positive and negative electrodes. Batteries generally called lithium-ion secondary batteries are typical examples included in the lithium secondary battery in the present description.

<Lithium Secondary Battery>

Figure 2:
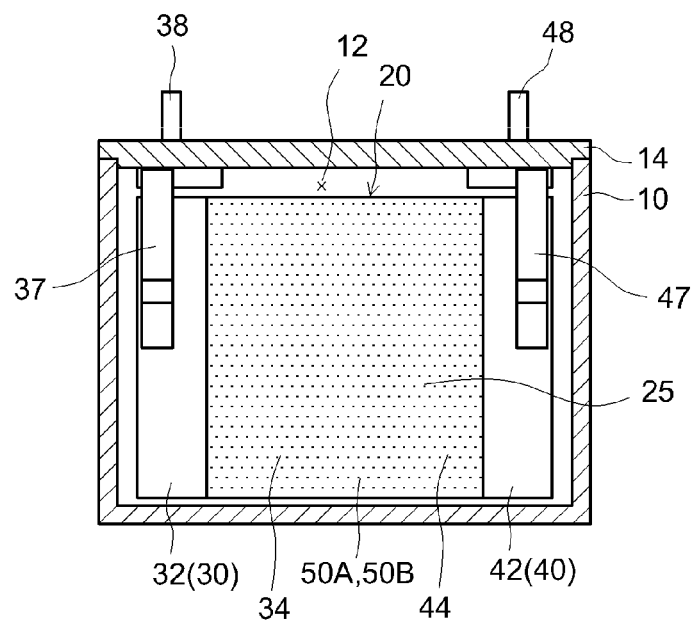
FIG. 2 shows a cross-sectional view taken along the line II-II in FIG. 1.

As shown in FIG. 1 and FIG. 2, a lithium secondary battery 100 comprises a square-shaped battery case 10 and a wound electrode body 20 contained in the battery case 10. Battery case 10 has an opening 12 on the top face. After wound electrode body 20 is placed via opening 12 into battery case 10, the opening 12 is sealed with a lid 14. A non-aqueous electrolyte solution 25 is also contained in the battery case 10. Lid 14 is provided with an outer positive terminal 38 and an outer negative terminal 48. Terminals 38 and 48 partially protrude from the surface of lid 14. Part of outer positive terminal 38 is connected to an inner positive terminal 37 inside the battery case 10 while part of outer negative terminal 48 is connected to an inner negative terminal 47 inside the battery case 10.

Figure 3:
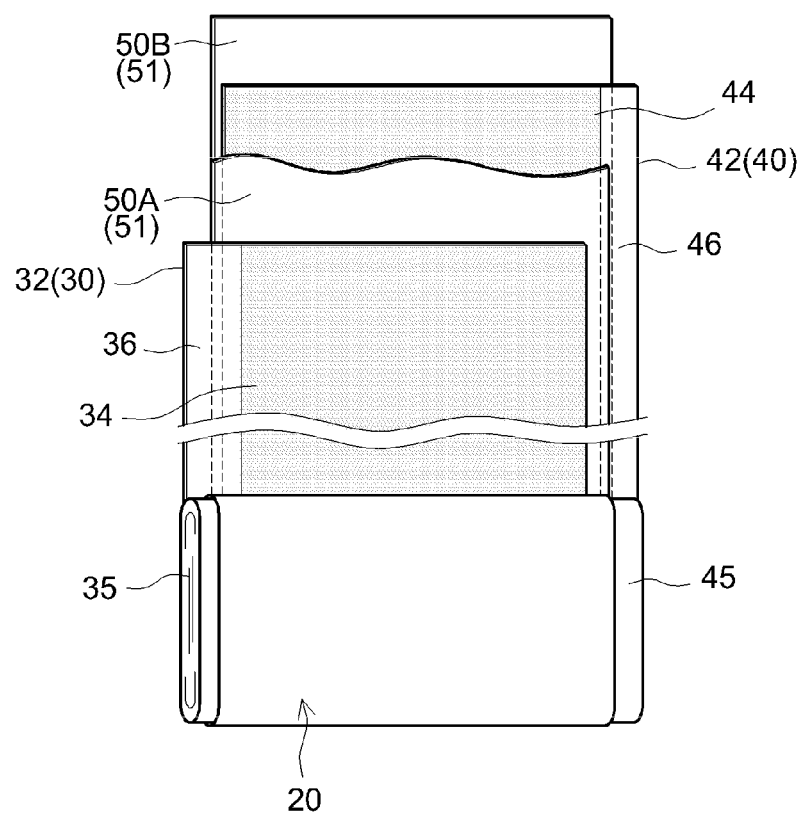
FIG. 3 shows a perspective view schematically illustrating the state of an electrode body according to an embodiment being prepared by means of winding.

As shown in FIG. 3, wound electrode body 20 comprises a long sheet of a positive electrode (positive electrode sheet) 30 and a long sheet of a negative electrode (negative electrode sheet) 40. Positive electrode sheet 30 comprises a length of a positive current collector 32 and a positive electrode material layer 34 formed above at least one (typically each) face thereof. Negative electrode sheet 40 comprises a length of a negative current collector 42 and a negative electrode material layer 44 formed above at least one (typically each) face thereof. Wound electrode body 20 further comprises two long sheets of separator (separator sheets) 50 A and 50B. Positive electrode sheet 30 and negative electrode sheet 40 are layered via two separator sheets 50A and 50B, in the order of positive electrode sheet 30, separator sheet 50A, negative electrode sheet 40 and separator sheet 50B. The layered body is wound in the length direction to form a wound body. The wound body is then laterally compressed and flattened to form a flat shape. The electrode body is not limited to a wound electrode body. Depending on the shape and purpose of the battery, for instance, it may have a suitable shape and constitution such as a laminate form, etc.

On the wound electrode body 20, there is formed centrally widthwise (perpendicularly to the winding direction) a portion where the positive electrode material layer 34 formed above the surface of positive current collector 32 and negative electrode material layer 44 formed above the surface of negative current collector 42 are thickly laminated in layers. In positive electrode sheet 30, one edge across the width direction is provided with a portion where positive current collector 32 is exposed with no positive electrode material layer 34 formed thereon (positive electrode material layer-free portion 36). The positive electrode material layer-free portion 36 extends beyond separator sheets 50A, 50B and negative electrode sheet 40. That is, in wound electrode body 20, on one edge across the width direction, there is formed a positive current collector-overlapping portion 35 where the positive electrode material layer-free portion 36 of positive current collector 32 overlaps with itself. On the other edge across the width direction in wound electrode body 20, there is formed also a negative current collector-overlapping portion 45 where the negative electrode material layer-free portion 46 of negative current collector 42 overlaps with itself. Separator sheets 50A and 50B have widths larger than the width of the laminated portion of positive electrode material layer 34 and negative electrode material layer 44, but smaller than the width of wound electrode body 20. These separators placed intermediately in the laminated portion of positive electrode material layer 34 and negative electrode material layer 44 prevent positive electrode material layer 34 and negative electrode material layer 44 from coming into contact with each other and causing internal short-circuit. In this embodiment, each of separator sheets 50A and 50B is a three-layer sheet formed of polypropylene(PP)/polyethylene(PE)/polypropyelene (PP).

Figure 4:
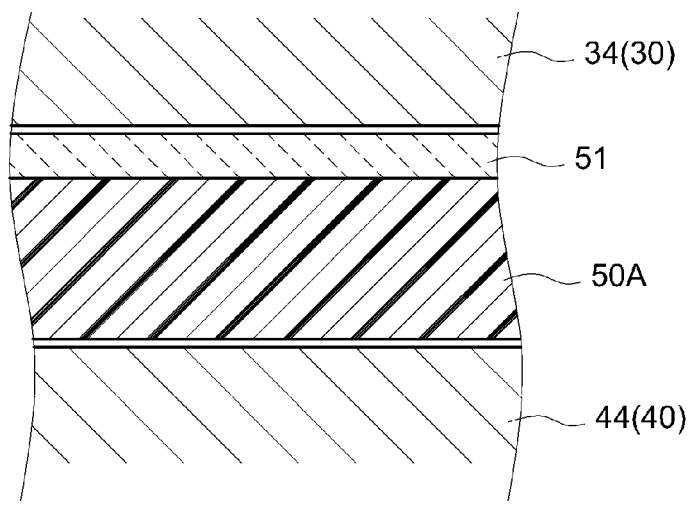
FIG. 4 shows an enlarged view of a partial cross section from the positive electrode through the negative electrode in a constitutional example of the wound electrode body shown in FIG. 3.

As shown in FIG. 4, on the positive electrode 30 side surface of separator sheet 50A, there is formed a lithium titanate-containing layer (or "LTO layer" hereinafter) 51 to cover the entire surface. The LTO layer 51 is isolated from negative electrode sheet 40. The activity of LTO layer 51 will be described here now. When charged to a high voltage (e.g. 4.5 V or higher), a certain metal (typically a transition metal such as Mn, etc.) may be dissolved out from the positive electrode. The dissolved metal irreversibly precipitates out on the negative electrode surface. This precipitate is considered to deactivate some lithium capable of contributing to charging and discharging, causing battery capacity reduction. However, with the LTO layer 51 being in a place isolated from negative electrode sheet 40, the LTO layer 51 captures the metal dissolved out from positive electrode sheet 30 and inhibits the metal from precipitating out on the negative electrode. Separator 50B can have the same constitution as separator 50A and an LTO layer may be formed thereon similarly to separator 50A.

Figure 5:
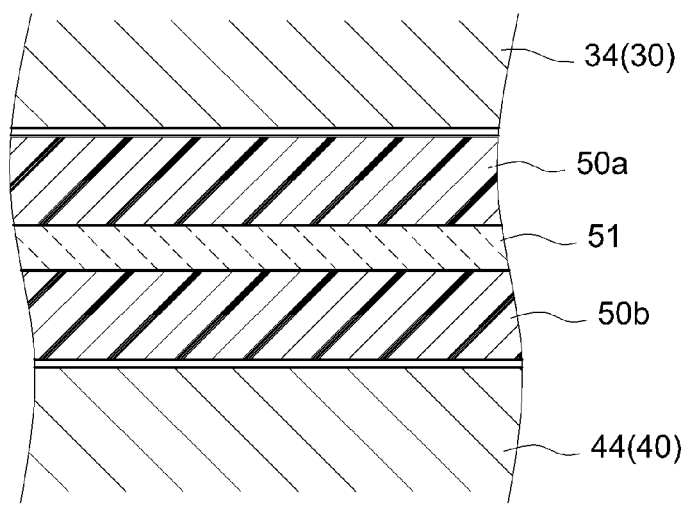
FIG. 5 corresponds to FIG. 4, showing an enlarged cross-sectional view from the positive electrode through the negative electrodes in another constitutional example of the wound electrode body.

The LTO layer should just be included in the electrode body and isolated from the negative electrode. Otherwise, its constitution or placement is not limited. When the LTO layer is in contact with the negative electrode, the capacity reduction tends to rather increase. For example, as shown in FIG. 5, two separator sheets 50a and 50b may be placed between positive electrode sheet 30 and negative electrode sheet 40, and an LTO layer 51 may be placed between the two separator sheets 50a and 50b. In this case, the separator sheets 50a and 50b can be independently a single-layer or multi-layer sheet. An LTO layer may also be provided on the positive electrode surface.

With the lithium titanate content in the positive electrode (typically in the positive electrode material layer), the positive electrode (typically the positive electrode material layer) can serve as an LTO layer. Alternatively, an embodiment where the LTO layer is the positive electrode material layer may be excluded. A separator (e.g. at least one layer in a multi-layer separator) may be allowed to comprise lithium titanate, and this lithium titanate-containing separator can be utilized as an LTO layer.

The LTO layer is preferably placed between the positive electrode and negative electrode in view of the capability to capture dissolved metal(s). From the same standpoint, it is particularly preferable that the LTO layer faces the surfaces of positive and negative electrodes between the positive and negative electrodes. It is noted that since the LTO layer can be distinguished from one used as a reference electrode, a member that comprises lithium titanate to serve as a reference electrode may be excluded from the LTO layer disclosed herein.

The LTO layer may be provided only regionally between the positive electrode and negative electrode. For example, the LTO layer may be provided not above the entire surface of separator, but only above a partial region. In particular, when the electrode body is constituted as a wound electrode body, the LTO layer may be provided only to an outer region (typically, some area including some outermost circumference of the positive electrode sheet). Metal dissolution is likely to occur around the outermost circumference of the wound electrode body. Thus, this constitution can preferably prevent the dissolved metal from precipitating out on the negative electrode surface.

<Positive Electrode>

The respective components constituting the lithium secondary battery are described next. As the positive current collector constituting the positive electrode (e.g. a positive electrode sheet) in the lithium secondary battery, a conductive material formed of a metal having good conductivity can be preferably used. As such a conductive material, for example, can be used aluminum or an alloy containing aluminum as the primary component. The shape of positive current collector is not particularly limited as it may vary depending on the shape, etc., of the battery, and may have a variety of shapes such as a rod, plate, sheet, foil, mesh, and so on. The thickness of positive current collector is not particularly limited, either, and can be, for instance, 8 μm to 30 μm. The positive electrode material layer may comprise, in addition to a positive electrode active material, additives such as a conductive material, binder, etc., as necessary.

As the positive electrode active material, it uses a material having an operating voltage (vs. Li/Li$^+$) higher than that of a general lithium secondary battery (with about 4.2 V upper operating voltage limit) at least in a partial range between 0% SOC (state of charge) and 100% SOC. For example, can be preferably used a positive electrode active material having an operating voltage (upper operating voltage limit) of 4.5 V (vs. Li/Li$^+$) or higher. In other words, it is preferable to use a positive electrode active material whose maximum operating voltage is 4.5 V (vs. Li/Li$^+$) or higher in the range from 0% SOC to 100% SOC. The use of such a positive electrode active material can bring about a lithium secondary battery whose positive electrode operates at a voltage of 4.5 V (vs. Li/Li$^+$) or higher. The upper operating voltage limit (vs. Li/Li$^+$) of the positive electrode active material is preferably higher than 4.5 V, or more preferably 4.6 V or higher (typically 4.7 V or higher). While the upper limit of the operating voltage (vs. Li/Li$^+$) is not particularly limited, it can be 5.5 V or lower (e.g. 5.3 V or lower, typically 5.1 V or lower).

Herein, the operating voltage of a positive electrode active material can be determined as follows. In particular, a three-electrode cell is constructed, using a positive electrode comprising a positive electrode active material to be measured as a working electrode (WE), along with a lithium metal piece as a counter electrode (CE), another lithium metal piece as a reference electrode (RE), and an electrolyte solution containing approximately 1 mol/L of LiPF$_6$ in a mixed solvent at ethylene carbonate (EC):dimethyl carbonate (DMC)=30:70 (by volume). Based on the theoretical capacity of the cell, the SOC value of the cell is changed by a 5% increment from 0% SOC to 100% SOC. The SOC can be adjusted, for instance, by applying a constant-current charge between WE and CE with a general charging/discharging device or a potentiostat. The cell adjusted to each SOC value is left standing for one hour and then subjected to a measurement of voltage across WE and RE. The voltage (vs. Li/Li$^+$) can be recorded as the operating voltage of the positive electrode active material at that particular SOC value.

Between 0% SOC and 100% SOC, the operating voltage of a positive electrode active material generally maximizes over a range that includes 100% SOC. Thus, the upper operating voltage limit of the positive electrode active material (e.g., whether or not it is at least 4.5 V) can be usually assessed based on the operating voltage of the positive electrode active material at 100% SOC (i.e., in a fully charged state). The operating voltage (upper operating voltage limit) (vs. Li/Li$^+$) of positive electrode active material at 100% SOC is preferably higher than 4.4 V, or more preferably 4.5 V or higher (e.g. 4.6 V or higher, typically 4.7 V or higher). In typical, the art disclosed herein is preferably applied to a non-aqueous electrolyte secondary battery having an operating voltage (upper operating voltage limit) (vs. Li/Li$^+$) of positive electrode active material of 7.0 V or lower (typically 6.0 V or lower, e.g. 5.5 V or lower) at 100% SOC.

As the positive electrode active material, one, two or more species among various materials known to be usable as positive electrode active materials in lithium secondary batteries can be used without particular limitations. The positive electrode active material may typically be in a form of particles having an average particle diameter of about 1 μm to 20 μm (e.g. 2 μm to 10 μm). In this description, unless otherwise indicated, the term "average particle diameter" refers to the median diameter ($D_{50}$) in its volume-based size distribution obtained with a general laser diffraction-type particle size analyzer. As the positive electrode active material, can be used, for instance, a spinel or layered lithium transition metal composite oxide comprising lithium (Li) and at least one species of transition metal as metal constituents, a polyanion-based (e.g. olivine-type) lithium transition metal composite oxide, etc.

Examples of a spinel lithium transition metal composite oxide include a spinel lithium manganese composite oxide comprising at least manganese (Mn) as a transition metal. More specifically, a spinel lithium manganese composite oxide represented by a general formula $Li_pMn_{2-q}M_qO_{4+\alpha}$ is cited. Herein, p meets 0.9≤p≤1.2; q meets 0≤q≤2, typically 0≤q≤1 (e.g. 0.2≤q≤0.6); and α a value satisfying −0.2≤α≤0.2 while keeping a net neutral charge. When q is greater than 0 (0<q), M may be one, two or more species selected from optional metals excluding Mn or non-metals. More specifically, it can be Na, Mg, Ca, Sr, Ti, Zr, V, Nb, Cr, Mo, Fe, Co, Rh, Ni, Pd, Pt, Cu, Zn, B, Al, Ga, In, Sn, La, Ce, etc. Among these, at least one species of transition metal such as Fe, Co, Ni, etc., can be preferably used. Specific examples include $LiMn_2O_4$, $LiCrMnO_4$ and the like.

In the art disclosed herein, of the transition metal(s) contained in the positive electrode active material, for example, Mn preferably accounts for 50% or more by the number of atoms. A positive electrode active material having such a composition is preferable from the standpoint of costs and supply risks of raw materials, as it mainly uses Mn which is an abundant, inexpensive metal. A positive electrode active material comprising Mn (e.g. a spinel lithium manganese composite oxide) also tends to be susceptible to Mn dissolution from the positive electrode active material. To inhibit the dissolved Mn from precipitating out on the negative electrode, the art disclosed herein (typically the technique to provide an LTO layer isolated from the negative electrode) can be preferably applied.

As a particularly preferable embodiment, a compound such that M in the general formula includes at least Ni (a lithium nickel manganese composite oxide) is cited. More specifically, a spinel lithium nickel manganese composite oxide represented by a general formula $Li_x(Ni_yMn_{2-y-z}M^1_z)O_{4+\beta}$ is cited. Herein, $M^1$ may be an arbitrary transition metal excluding Ni and Mn or a main group metal (e.g. one, two or more species selected from Fe, Co, Cu, Cr, Zn and Al). In particular, $M^1$ preferably includes at least either trivalent Fe or Co. Alternatively, it may be a metalloid (e.g. one, two or more species selected from B, Si and Ge) or a non-metal. In addition, x meets 0.9≤x≤1.2; y meets 0≤y; z meets 0≤z; y+z≤2 (typically y+z≤1); and β may be the same as a described above. In a preferable embodiment, y meets 0.2≤y≤1.0 (more preferably 0.4≤y≤0.6, e.g. 0.45≤y≤0.55); z meets 0≤z≤1.0 (e.g. 0≤z≤0.3). Specific examples include $LiNi_{0.5}Mn_{1.5}O_4$, etc. With such a composition, the positive electrode potential can be increased (typically to 4.5 V (vs. Li/Li$^+$) or higher) at charge completion, allowing for construction of a 5 V class lithium secondary battery. A compound having such a composition is highly durable as well. The presence of a spinel structure in the compound (oxide) can be determined by X-ray structural analysis (preferably single crystal X-ray structural analysis). More specifically, it can be determined by measurement with an X-ray diffraction system using CuKα radiation (wavelength 0.154051 nm) (e.g. "Single Crystal Automatic X-ray Diffractometer" available from Rigaku Corporation).

Such a lithium manganese composite oxide can be obtained by a heretofore known preparation method. For example, starting materials selected in accordance with the target composition (e.g. a lithium source and transition metal sources comprising nickel and manganese) are mixed at a prescribed ratio and the mixture is calcined by a suitable means. Suitable pulverization, granulation and classification of the resultant can yield an oxide having desirable characteristics.

Alternatively, the positive electrode active material can be the following compounds.

(1) A lithium transition metal composite oxide represented by a general formula $LiMO_2$, typically having a layered structure. Herein, M comprises at least one species of transition metal such as Ni, Co, Mn, etc., and may further comprise other metal(s) or non-metal(s). Specific examples include $LiNiO_2$, $LiNi_{1/3}Co_{1/3}Mn_{1/3}O_2$ and the like.

(2) A lithium transition metal composite oxide represented by a general formula $Li_2MO_3$. Herein, M comprises at least one species of transition metal such as Mn, Fe, Co, etc., and may further comprise other metal(s) or non-metal(s). Specific examples include $Li_2MnO_3$, $Li_2PtO_3$ and the like.

(3) A lithium transition metal compound (phosphate) represented by a general formula $LiMPO_4$. Herein, M comprises at least one species of transition metal such as Mn, Fe, Ni, Co, etc., and may further comprise other metal(s) or non-metal(s). Specific examples include $LiMnPO_4$, $LiFePO_4$ and the like.

(4) A lithium transition metal compound (phosphate) represented by a general formula $Li_2MPO_4F$. Herein, M comprises at least one species of transition metal such as Mn, Ni, Co, etc., and may further comprise other metal(s) or non-metal(s). Specific examples include $Li_2MnPO_4F$ and the like.

(5) A solid solution of $LiMO_2$ and $Li_2MO_3$. Herein, $LiMO_2$ refers to a composition represented by the general formula shown in (1) above while $Li_2MO_3$ refers to a composition represented by the general formula shown in (2) above. A specific example is a solid solution represented by $0.5LiNiMnCoO_{2-0.5}Li_2MnO_3$.

These positive electrode active materials can be used singly as one species or in combination of two or more species. In particular, the positive electrode active material preferably comprises the spinel lithium manganese composite oxide (preferably a lithium nickel manganese composite oxide) at a ratio of 50% by mass or more (typically 50% by mass to 100% by mass, e.g. 70% by mass to 100% by mass, preferably 80% by mass to 100% by mass) of the total positive electrode active material used. It is preferable that the positive electrode active material essentially consists of a spinel lithium manganese composite oxide (preferably a lithium nickel manganese composite oxide).

At a voltage as high as or higher than 4.5 V (vs. $Li/Li^+$), there is a tendency that the crystal structure becomes disordered in the aforementioned layered lithium transition metal composite oxide (layered compound) and a certain transition metal (e.g. Mn) constituting the compound gradually dissolve into the electrolyte solution. Thus, repeated charging and discharging are likely to cause gradual capacity loss with reduced durability. From such a standpoint, in another preferable embodiment, the positive electrode active material may be essentially free of a layered compound. More specifically, it is preferable that the layered compound content in the total positive electrode active material is 5% by mass or less, typically 2% by mass or less, or preferably 1% by mass or less (more preferably 0.1% by mass or less).

As the conductive material, various kinds of carbon material can be preferably used. More specifically, for instance, it can be one, two or more species selected from carbon materials such as various types of carbon black, coke, activated carbon, graphite (natural graphite, synthetic graphite), carbon fiber, carbon nanotube, fullerene, graphene and the like. In particular, it is preferable to use a carbon black (typically acetylene black) having relatively small particle diameters and a large specific surface area. Alternatively, it can be a powdered metal such as copper, nickel, etc., and an organic conductive material such as a polyphenylene derivative, etc. These can be used singly as one species or as a mixture of two or more species.

Examples of the binder include various polymer materials. For instance, when the positive electrode material layer is formed with an aqueous composition (a composition wherein water or a mixed solvent primarily comprising water is used as the dispersion medium for active material particles), a water-soluble or water-dispersible polymer material can be preferably used as a binder. Examples of water-soluble or water-dispersible polymer materials include cellulose-based polymers such as carboxymethyl cellulose (CMC), etc.; polyvinyl alcohol (PVA); fluorine-based resins such as polytetrafluoroethylene (PTFE), etc.; rubbers such as styrene-butadiene rubber (SBR), acrylic acid-modified SBR resins (SBR-based latexes), etc.; and the like. Alternatively, when the positive electrode material layer is formed with a solvent-based composition (a composition whose dispersion medium for active material particles primarily comprises an organic solvent), can be used polymer materials including vinyl halide resins such as polyvinylidene fluoride (PVdF), polyvinylidene chloride (PVdC), etc.; polyalkylene oxides such as polyethylene oxide (PEO), etc.; and the like. These binders can be used singly as one species or in combination of two or more species. The polymer materials exemplified above may be used also as thickeners or other additives in the positive electrode material layer-forming composition, besides being used as the binder.

The positive electrode active material content in the positive electrode material layer is higher than about 50% by mass, or preferably about 70% by mass to 97% by mass (e.g. 75% by mass to 95% by mass). The additive content in the positive electrode material layer is not particularly limited. The conductive material content is preferably about 1 part by mass to 20 parts by mass (e.g. 2 parts by mass to 15 parts by mass, typically 3 parts by mass to 12 parts by mass) relative to 100 parts of positive electrode active material. The binder content is preferably about 0.8 part by mass to 10 parts by mass (e.g. 1 part by mass to 7 parts by mass, typically 2 parts by mass to 5 parts by mass) relative to 100 part by mass of positive electrode active material.

The method for fabricating a positive electrode as described above is not particularly limited and a conventional method can be suitably used. For instance, it can be fabricated by the following method. First, a positive electrode active material and, as necessary, a conductive material, binder, etc., are mixed with a suitable solvent (an aqueous solvent, non-aqueous solvent or a mixed solvent of these) to prepare a paste-like or slurry positive electrode material layer-forming composition. The mixing can be carried out, for instance, using a suitable mixer (planetary mixer, etc.). For the solvent used to prepare the composition, any of aqueous solvents and non-aqueous solvents can be used. The aqueous solvent should just show aqueous properties, and water or a solvent mixture primarily comprising water can be preferably used. Preferable examples of non-aqueous solvents include N-methyl-2-pyrrolidone (NMP), methyl ethyl ketone, toluene, etc.

The composition thus prepared is applied to a positive current collector and then pressed after the solvent is allowed to evaporate off by drying. As a method for applying the composition to the positive current collector, can be suitably employed a technique similar to conventionally-known methods. For example, with a suitable applicator such as die coater, etc., the composition can be preferably applied to the positive current collector. The solvent can be dried off well by employing one or a combination of natural drying, heated air, low-humidity air, vacuum, infrared rays, far-infrared rays and electron beam. As a pressing method, can be employed a compression method such as a conventionally-known roll-pressing method or a flat-press method, etc. To adjust the thickness, the thickness can be measured with a thickness gauge and pressed several times to a desirable thickness by adjusting the press pressure. A positive electrode can be thus obtained having a positive electrode material layer formed on the positive current collector.

The coating weight of positive electrode material layer (non-volatile-based coating amount of positive electrode material layer-forming composition) per unit surface area of positive current collector is not particularly limited. From the standpoint of obtaining sufficient conductive paths (conducing paths), it is preferably 3 $mg/cm^2$ or greater (e.g. 5 $mg/cm^2$ or greater, typically 6 $mg/cm^2$ or greater), but 45 $mg/cm^2$ or less (e.g. 28 $mg/cm^2$ or less, typically 15 $mg/cm^2$ or less) per face of positive current collector. While the density of positive electrode material layer is not particularly limited, either, it is preferably 1.0 $g/cm^3$ to 3.8 $g/cm^3$ (e.g. 1.5 $g/cm^3$ to 3.5 $g/cm^3$, typically 2.0 $g/cm^3$ to 3.0 $g/cm^3$).

<Negative Electrode>

As the negative current collector constituting the negative electrode (e.g. a negative electrode sheet), can be preferably used a conductive member formed of a metal having a good conductivity. For example, can be used copper or an alloy comprising copper as the primary component. The shape of negative current collector is not particularly limited as it may vary in accordance with the shape of the battery, etc. It may be in various forms including shapes of a rod, plate, sheet, foil, mesh, and so on. The thickness of negative current collector is not particularly limited, either. It can be, for example, 8 µm to 30 µm.

The negative electrode material layer comprises a negative electrode active material capable of storing and releasing Li ions which serve as charge carriers. The composition and shape of negative electrode active material are not particularly limited. One, two or more species of substance conventionally used in lithium secondary batteries can be used. The negative electrode active material may have a form of particles typically having an average particle diameter of about 1 µm to 20 µm (e.g. 4 µm to 10 µm). Examples of such a negative electrode active material include carbon materials generally used in lithium secondary batteries. Typical examples of such carbon materials include graphite carbons (graphite), amorphous carbons and the like. It is preferable to use a granular carbon material (carbon particles) containing a graphite structure (layered structure) at least partially. In particular, the use of a carbon material primarily comprising natural graphite is preferable. The natural graphite may be obtained by spheroidizing graphite flakes. Alternatively, a carbonaceous powder obtained by coating graphite surfaces with an amorphous carbon can be used. As other negative electrode active materials, oxides such as lithium titanate, etc.; silicon materials, tin materials and so on can be used singly, as an alloy, as a compound formed therefrom or as a composite material combining these materials. In particular, it is especially preferable to use a negative electrode active material having a reduction potential (vs. Li/Li$^+$) of about 0.5 V or lower (e.g. 0.2 V or lower, typically 0.1 V or lower). The use of a negative electrode active material having such a reduction potential can bring about a high energy density. Examples of a material exhibiting such a low potential include a graphitic carbon material (typically graphite particles).

The negative electrode material layer may comprise, besides the negative electrode active material, one, two or more species of binder, thickener and other additives that can be used in a negative electrode material layer in a general lithium-ion secondary battery. Binders include various polymer materials. For example, with respect to an aqueous composition or a solvent-based composition, those that can be contained in the positive electrode material layer may be preferably used. Such binder may be used, not just as a binder, but also as a thickener or other additive in a negative electrode material layer-forming composition.

The negative electrode active material content in the negative electrode material layer exceeds about 50% by mass, or it is preferably about 90% by mass to 99% by mass (e.g. 95% by mass to 99% by mass, typically 97% by mass to 99% by mass). The additive content in the negative electrode material layer is not particularly limited. It is preferably about 0.8% by mass to 10% by mass (e.g. about 1% by mass to 5% by mass, typically 1% by mass to 3% by mass).

The method for fabricating a negative electrode is not particularly limited and a conventional method can be employed. For instance, it can be fabricated by the following method. First, a negative electrode active material is mixed along with a binder, etc., in an aforementioned suitable solvent (an aqueous solvent, organic solvent or a mixed solvent of these) to prepare a paste-like or slurry negative electrode material layer-forming composition. The composition thus prepared is applied to a negative current collector and then pressed after the solvent is allowed to evaporate off by drying. A negative electrode material layer can be thus formed with the composition on the negative current collector to obtain a negative electrode comprising the negative electrode material layer. For the mixing, coating, drying and pressing methods, means similar to those for the positive electrode fabrication can be employed.

The coating weight of negative electrode material layer (non-volatile-based coating amount of negative electrode material layer-forming composition) per unit surface area of negative current collector is not particularly limited. From the standpoint of obtaining sufficient conductive paths (conducing paths), it is preferably 2 mg/cm$^2$ or greater (e.g. 3 mg/cm$^2$ or greater, typically 4 mg/cm$^2$ or greater), but 40 mg/cm$^2$ or less (e.g. 22 mg/cm$^2$ or less, typically 10 mg/cm$^2$ or less) per face of negative current collector. While the density of negative electrode material layer is not particularly limited, either, it is preferably 1.0 g/cm$^3$ to 3.0 g/cm$^3$ (e.g. 1.2 g/cm$^3$ to 2.0 g/cm$^3$, typically 1.3 g/cm$^3$ to 1.5 g/cm$^3$).

<Separator>

The separator (separator sheet) placed so as to separate the positive electrode and negative electrode should be formed of a material that insulates the positive electrode material layer and negative electrode material layer while allowing transport of the electrolyte. As the separator, the same types as the sheets used as separators in conventional lithium secondary batteries can be used. Examples of such a material include porous media, non-woven fabric media, fabric media and the like. In particular, a porous sheet formed of a resin (a porous resin sheet) can be preferably used.

Preferable examples of the porous resin sheet include a sheet primarily constituted with a thermoplastic resin such as a polyolefin (polyethylene (PE), polypropylene (PP), etc.), polyester, polyamide, etc. A preferable example is a single-layer or multi-layer sheet (polyolefin-based sheet) primarily constituted with one, two or more species of polyolefin-based resin. For example, a PE sheet, PP sheet, three-layer (PP/PE/PP) sheet in which a PP layer is overlaid on each side of a PE layer) can be preferably used. The PE may be of any types including those generally called high density polyethylene (HDPE), low density polyethylene (LDPE) and linear low density polyethylene (LLDPE), or may be a mixture of these. The separator may comprise, as necessary, additives such as various kinds of plasticizer, antioxidant and so on.

As the resin sheet constituting a single-layer or multi-layer separator, for instance, a uni-axially stretched or bi-axially stretched porous resin sheet can be preferably used. In particular, a porous resin sheet uni-axially stretched in the length direction is particularly preferable as it has suitable strength while being less susceptible to thermal contraction in the width direction. When a separator having a uni-axially stretched porous resin sheet is used, thermal contraction in the length direction can also be suppressed in an embodiment where long sheets of positive electrode and negative electrode are wound together. Accordingly, a porous resin sheet uni-axially stretched in the length direction is particularly preferable as a component of the separator constituting the wound electrode body.

While the thickness of separator is not particularly limited, it is preferably about 5 µm to 40 µm (e.g. 10 µm to 30 µm, typically 15 µm to 25 µm). Having a thickness in this range, the separator will have good ion permeability and become less susceptible to damage. On the separator, a heat-resistant layer may be formed. When the liquid-form electrolyte is substituted with a solid-form (gel-form) electrolyte such as, for instance, the same electrolyte with an added polymer, the electrolyte itself can serve as a separator, and separator may not be required.

<LTO Layer>

The electrode body disclosed herein may comprise an LTO layer. The LTO layer comprises lithium titanate (or LTO hereinafter) and should be isolated from the negative electrode. Otherwise, there are no particular limitations. While the average particle diameter (average particle diameter $D_{50}$ described earlier) of LTO is not particularly limited, it is preferably about 0.5 µm to 3 µm (e.g. 0.8 µm to 2.5 µm, typically 1 µm to 2 µm). The potential of the LTO layer (typically LTO) may be adjusted (e.g. to about 1.5 V (vs. Li/Li$^+$)) or may be unadjusted. Either way, it can capture a certain metal (typically a transition metal such as Mn, etc.) dissolved out from the positive electrode. The voltage can be adjusted by allowing Li to be stored. When the voltage is unadjusted, the LTO potential is about 3 V (vs. Li/Li$^+$).

The LTO contained in the LTO layer is an oxide comprising lithium (Li) and titanium (Ti). For instance, it may be a compound represented by $Li_xTi_yO_z$ (0≤x≤4, 1≤y <5, 2≤z≤12). Specific examples include $Li_4Ti_5O_{12}$ and $Li_2Ti_3O_7$. In typical, LTO may have a spinel structure represented by $Li_4Ti_5O_{12}$. LTO may be Rams Delight-type $LiTiO_4$ or anatase-type $Li_{0.5}TiO_2$.

The method for preparing the LTO is not particularly limited. For example, it can be prepared by mixing lithium hydroxide and titanium dioxide at a Li/Ti molar ratio in a prescribed range, followed by drying, followed by heating (calcining) at a temperature of 600° C. to 1200° C. (preferably 700° C. to 1000° C.) for 5 hours to 20 hours (preferably 7 hours to 14 hours).

LTO may include hydrogen (H). Hydrogen (H) may be included so as to partially substitute for lithium (Li). LTO may be represented by a formula:

$$Li_aTi_{5-b}M_bO_{12+c}$$

(in the formula, M is at least one species selected from a group consisting of V, Mn, Fe, Co, Ni, Cu, Zn, Al, B, Mg, Ca, Sr, Ba, Zr, Nb, Mo, W, Bi, Na and Ga; a is 3 to 5; b is 0.005 to 1.5; and c is −1 to 1). M is preferably at least one species selected from a group consisting of Mn, Fe, Co, Ni, Cu, Al, B, Mg, Zr, Nb and W. For the LTO, solely one species or a mixture of two or more species can be used.

The LTO layer preferably comprises an additive such as binder, etc. When the LTO layer-forming composition is based on an aqueous solvent (when it is a solution using water or a mixed solvent primarily comprising water as the dispersion medium for binder), a polymer dispersible or soluble in the aqueous solvent is used as the binder. Acrylic resins are cited as an example of a polymer dispersible or soluble in aqueous solvents. As an acrylic resin, can be preferably used a homopolymer obtainable by polymerization of a single species of monomer among acrylic acid, methacrylic acid, acrylamide, methacrylamide, 2-hydroxyethyl acrylate, 2-hydroxyethyl methacrylate, methyl methacrylate, 2-ethylhexyl acrylate, butyl acrylate, etc. Alternatively, it can be a copolymer obtainable by polymerization of two or more species among these monomers. It can be even a mixture of two or more species among the homopolymers and copolymers. Besides the acrylic resins, can be used rubbers such as styrene-butadiene rubber (SBR), acrylic acid-modified SBR resin (SBR-based latex), gum arabic, etc.; polyolefin-based resins such as polyethylene (PE), etc.; cellulose-based polymers such as carboxymethyl cellulose (CMC), methyl cellulose (MC), etc.; polyvinyl alcohol (PVA); fluorine-based resins such as polytetrafluoroethylene (PTFE), etc.; vinyl acetate polymers; polyalkylene oxides such as polyethylene oxide (PEO), etc.; and the like. These polymers can be used singly as one species or in combination of two or more species. In particular, acrylic resins, SBR, polyolefin-based resins and CMC are preferable.

When the LTO layer-forming composition is solvent-based (when it is a solution primarily using an organic solvent as the dispersion medium for binder), a polymer dispersible or soluble in the organic solvent can be used as the binder. Preferable examples of a polymer dispersible or soluble in organic solvents include halogenated vinylic resins such as a polyvinylidene fluoride (PVdF) and the like. As the polyvinylidene fluoride, vinylidene fluoride homopolymer is preferably used. The polyvinylidene fluoride may be a copolymer of vinylidene fluoride and a copolymerizable vinylic monomer. Examples of a vinylic monomer copolymerizable with vinylidene fluoride include hexafluoropropylene, tetrafluoroethylene, trichlorofluoroethylene, etc. Alternatively, as polymers dispersible or soluble in organic solvents, polytetrafluoroethylene (PTFE), polyacrylonitrile, polymethyl methacrylate and the like are preferably used. These can be used singly as one species or in combination of two or more species.

The form of binder is not particularly limited. Binder particles (powder) can be used as is, or prepared into a solution form or emulsion form for use. Two or more species of binder can be used in different forms, respectively. When a particle-form binder is used, the average particle diameter (average particle diameter $D_{50}$ described earlier) is, for instance, about 0.09 µm to 0.15 µm. Other than as a binder, the binder may be used to serve as a thickener or other additive in the LTO layer-forming composition.

When the LTO layer is formed on the separator or positive electrode surface, the LTO content in the total LTO layer is not particularly limited while it is preferably about 50% by mass or greater (e.g. 70% by mass or greater, typically 80% by mass or greater). This is because, with increasing LTO content, there is a tendency that a greater amount of metal dissolved out from the positive electrode is captured. Thus, the LTO content is more preferably 90% by mass or greater (e.g. 92% by mass to 99.5% by mass, typically 95% by mass to 99% by mass). When the LTO layer comprises additives such as binder, thickener, etc., the additive content in the LTO layer is preferably about 0.1% by mass to 10% by mass (e.g. 0.5% by mass to 8% by mass, typically 1% by mass to 5% by mass). This increases the anchoring ability of the LTO layer or the strength (shape-stability) of LTO layer itself. When the LTO layer is formed on the separator surface, it also makes it easier to adjust the separator's strength or elongation to be in a suitable range.

The method for forming the LTO layer disclosed herein is not particularly limited. For example, it can be formed by the following method. First, an aforementioned LTO as well as binder and other additives as necessary are mixed and dispersed in a suitable solvent to prepare a paste-like or slurry LTO layer-forming composition. Mixing and dispersing can be carried out using a suitable mixer such as dispermill, clearmix, filmix, ball mill, homodisper, ultrasonic disperser, etc. The proportions of LTO, binder and other additives added as necessary in the paste-like or slurry LTO layer-forming composition can be the same as their respective proportions in the LTO layer described earlier, based on non-volatiles.

The solvent used in the LTO layer-forming composition can be water or a solvent mixture primarily comprising water. As the solvent forming the solvent mixture besides water, one, two or more species can be suitably selected and used among organic solvents (lower alcohols such as ethanol, etc., lower ketones) that are miscible with water. Alternatively, solely one species or a combination of two or more species can be used among organic solvents, such as N-methyl-2-pyrrolidone (NMP), pyrrolidone, methyl ethyl ketone, methyl isobutyl ketone, cyclohexanone, toluene, dimethylformamide, dimethylacetamide, etc. The solvent content in the LTO layer-forming composition is not particularly limited. It can be 30% by mass to 90% by mass (e.g. 40% by mass to 60% by mass) of the total composition.

Subsequently, a suitable amount of the resulting paste-like or slurry LTO layer-forming composition can be applied to a surface of at least either the separator or positive electrode, and further allowed to dry to form an LTO layer. To apply the LTO layer-forming composition to the surface of at least either the separator or positive electrode, a heretofore general application method can be used without particular limitations. For example, using a suitable applicator (gravure coater, slit coater, die coater, comma coater, clip coater, etc.), to the surface of at least either the separator or positive electrode, a prescribed amount of the LTO layer-forming composition is applied to a uniform thickness. Subsequently, by drying the coating by a suitable drying means, the solvent is removed from the LTO layer-forming composition. For the drying means, natural drying, hot air, low-humidity air, vacuum, infrared radiation and far infrared radiation can be applied by itself or in combination. For instance, when the LTO layer is formed on the separator, the drying can be carried out at a temperature below the melting point(s) of the material(s) constituting the separator, for example, at 110° C. or below (typically 30° C. to 80° C.). Alternatively, it can be stored to dry at a low temperature under reduced pressure. By removing the solvent from the LTO layer-forming composition, an LTO layer can be formed. As necessary, the resultant can be pressed by a press method such as a heretofore known roll press method, flat-bed press method, etc. In such a way, an electrode body can be obtained with an LTO layer placed on a surface of at least either the separator or positive electrode.

While the thickness of LTO layer is not particularly limited, it is preferably about 1 μm to 18 μm (e.g. 3 μm to 15 μm, typically 5 μm to 12 μm). Having a thickness in this range, the LTO layer can suitably capture a certain metal dissolved out from the positive electrode without sacrificing the energy density. When the LTO layer is formed on the separator, it also makes it easier to adjust the separator's strength or elongation to be in a preferable range. The thickness of LTO layer can be determined by analyzing an image taken with SEM (scanning electrode microscope).

It is possible to include LTO in at least one layer in the separator and have this layer to serve as an LTO layer. More specifically, LTO can be added to a layer (typically an intermediate resin layer) located at the center of a three-layer separator, or to a layer located on the positive electrode side (typically a resin layer facing the positive electrode). Alternatively, LTO can be included in a layer (typically a resin layer) located on the negative electrode side of a multi-layer separator. In this case, an additional layer such as a heat-resistant layer can be provided to the negative electrode side surface of separator so that the LTO layer is isolated from the negative electrode. By the same means, LTO can be included in a single-layer separator as well.

When LTO is included in the separator to form an LTO layer as described above, from the standpoint of capturing the metal dissolved out from the positive electrode without impairing its function as a separator, the thickness of LTO layer is preferably about 5 μm to 40 μm (e.g. 10 μm to 30 μm, typically 15 μm to 25 μm). When the separator has a multi-layer constitution and one layer thereof is made as an LTO layer, the thickness of LTO layer is preferably about 3 μm to 20 μm (e.g. 5 μm to 15 μm, typically 7 μm to 12 μm).

The amount of LTO added to the separator is not particularly limited. From the standpoint of capturing the metal dissolved out from the positive electrode, it is preferably 5% by mass or more (e.g. 10% by mass or more, typically 30% by mass or more). It can be even 50% by mass or more (e.g. 70% by mass or more, typically 80% by mass or more, but 90% by mass or less). From the standpoint of not impairing the function of separator (e.g. insulation, ion permeability, electrolyte solution retention, etc.), it is preferably 50% by mass or less (e.g. 30% by mass or less, typically 15% by mass or less). It can be even 10% by mass or less (e.g. 8% by mass or less, typically 1% by mass or more, but 5% by mass or less).

Alternatively, LTO can be included in the positive electrode (typically in the positive electrode material layer). This allows the positive electrode to serve as an LTO layer. In this case, the amount of LTO added to the positive electrode (typically to the positive electrode material layer) is preferably 3 parts by mass or more (e.g. 5 parts by mass or more, typically 8 parts by mass or more) relative to 100 parts by mass of the total amount of heretofore known positive electrode material layer components (positive electrode active material, conductive material and binder, etc.). From the standpoint of not impairing the function of positive electrode, it is preferably 15 parts by mass or less (e.g. 12 parts by mass or less, typically 10 parts by mass or less) relative to 100 parts by mass of the total amount of heretofore known positive electrode material layer components.

<Non-Aqueous Electrolyte Solution>

The non-aqueous electrolyte solution injected into the lithium secondary battery may comprise at least a non-aqueous solvent and a supporting salt. Typically, it is an electrolyte solution having a composition comprising a supporting salt in a suitable non-aqueous solvent. Examples of the non-aqueous solvent include ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethylsulfoxide, sulfolane, γ-butyrolactone, etc., among which solely one species or a mixture of two or more species can be used. In particular, a solvent mixture of EC, DMC and EMC is preferable.

The non-aqueous electrolyte solution preferably comprises, as the non-aqueous solvent, one, two or more species of fluorinated carbonate (e.g. a fluoride of an aforementioned carbonate). Either a fluorinated cyclic carbonate or fluorinated acyclic carbonate can be preferably used. Usually, it is preferable to use a fluorinated carbonate having one carbonate moiety per molecule. The F-substitution ratio in such a fluorinated carbonate is usually suitable to be 10% or greater, or for instance, it can be 20% or greater (typically 20% or greater, but smaller than 100%, e.g., 20% or greater, but 80% or smaller).

The fluorinated carbonate preferably exhibits an oxidation potential equal to or higher than the operating voltage (upper operating voltage limit) (vs. Li/Li$^+$) of the positive electrode active material. As such a fluorinated carbonate, it is preferable to use, for example, one having an oxidation potential higher than the upper operating voltage limit (vs. Li/Li$^+$) of the positive electrode active material by greater than 0 V (typically by about 0.1 V to 3.0 V, preferably by about 0.2 V to 2.0 V, e.g., by about 0.3 V to 1.0 V), by greater than 0V but less than about 0.3 V, or by 0.3 V or greater (typically by about 0.3 V to 3.0 V, preferably by about 0.3 V to 2.0 V, e.g., by about 0.3 V to 1.5 V).

The oxidation potential (vs. Li/Li$^+$) of an electrolyte solution can be measured by the following method. First, using LiNi$_{0.5}$Mn$_{1.5}$O$_4$, a working electrode (WE) is fabricated similarly to the positive electrode described later in the worked examples. A three-electrode cell is constructed with the WE fabricated, a lithium metal piece as a counter electrode (CE), another lithium metal piece as a reference electrode (RE) and the electrolyte solution to be measured. The three-electrode cell is subjected to a treatment to completely remove Li from the WE. In particular, at a temperature of 25° C., at a current value equivalent to one-fifth the battery capacity (Ah) predicted from the theoretical capacity of the WE, the cell is subjected to constant current charging to 4.5 V followed with constant voltage charging at 4.5 V until the current value decayed to 1/50 the initial current value (i.e. the current value equivalent to one-fifth the battery capacity). Subsequently, in a voltage range predicted to include the oxidation potential of the electrolyte solution being measured (typically in a voltage range higher than 4.5 V), constant current charging is carried out at an arbitrary voltage value for a prescribed time period (e.g. 10 hours) and the current value is measured during this operation. More specifically, the voltage is increased stepwise (e.g. by a 0.2 V increment) within the voltage range. Constant voltage charging is carried out at each step for a prescribed time period (e.g. about 10 hours) and the current value is measured during this operation. The voltage value at which the current value during constant voltage charging becomes greater than 0.1 mA can be recorded as the oxidation potential (redox potential) of the electrolyte solution.

A preferable fluorinated cyclic carbonate has 2 to 8 (more preferably 2 to 6, e.g., 2 to 4, typically 2 or 3) carbon atoms. With too many carbon atoms, the viscosity of the non-aqueous electrolyte solution may increase, or the ionic conductivity may decrease. For instance, a fluorinated cyclic carbonate represented by the following formula (C1) can be preferably used.

[Chem 1]

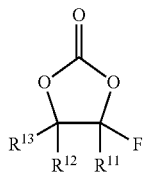

(C1)

In the formula (C1), each of R$^{11}$, R$^{12}$ and R$^{13}$ can be independently selected from a hydrogen atom, a fluorine atom, alkyl groups and haloalkyl groups having 1 to 4 (more preferably 1 or 2, typically 1) carbon atom(s), and other halogen atoms (preferably a chlorine atom) besides fluorine atom. The haloalkyl group may have a structure obtained by substituting one, two or more hydrogen atoms of the alkyl group with halogen atom(s) (e.g., fluorine atom(s) or chlorine atom(s), preferably fluorine atom(s)). In a preferable compound, one or two of R$^{11}$, R$^{12}$ and R$^{13}$ are fluorine atom(s). For instance, a compound with at least one of R$^{12}$ and R$^{13}$ being a fluorine atom is preferable. From the standpoint of decreasing the viscosity of the non-aqueous electrolyte solution, it is preferable to use a compound in which each of R$^{11}$, R$^{12}$ and R$^{13}$ is a fluorine atom or a hydrogen atom.

Specific examples of the fluorinated cyclic carbonate represented by the formula (C1) include mono-fluoroethylene carbonate (MFEC), difluoroethylene carbonate (DEFC), 4,4-difluoroethylene carbonate, trifluoroethylene carbonate, perfluoroethylene carbonate, 4-fluoro-4-methylethylene carbonate, 4,5-difluoro-4-methylethylene carbonate, 4-fluoro-5-methylethylene carbonate, 4,4-difluoro-5-methylethylene carbonate, 4-(fluoromethyl)-ethylene carbonate, 4-(difluoromethyl)-ethylene carbonate, 4-(trifluoromethyl)-ethylene carbonate, 4-(fluoromethyl)-4-fluoroethylene carbonate, 4-(fluoromethyl)-5-fluoroethylene carbonate, 4-fluoro-4,5-dimethylethylene carbonate, 4,5-difluoro-4,5-dimethylethylene carbonate, 4,4-difluoro-5,5-dimethylethylene carbonate, and the like. In particular, MFEC and DFEC are preferable.

As the non-aqueous electrolyte solution in the art disclosed herein, for instance, a fluorinated acyclic carbonate represented by the next formula (C2) can be used.

[Chem 2]

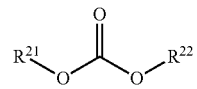

(C2)

At least either R$^{21}$ or R$^{22}$ (preferably each of these) in the formula (C2) is a F-containing organic group, and it can be, for example, a fluorinated alkyl group or a fluorinated alkyl ether group. It can be a fluorinated alkyl group or a fluorinated alkyl ether group that has been further substituted with a halogen atom other than a fluorine atom. One of R$^{21}$ and R$^{22}$ may be an organic group (e.g., an alkyl group or an alkyl ether group) not containing a fluorine atom. Each of R$^{21}$ and R$^{22}$ is preferably an organic group having 1 to 6 (more preferably 1 to 4, e.g., 1 to 3, typically 1 or 2) carbon atoms. With too many carbon atoms, the viscosity of the non-aqueous electrolyte solution may increase, or the ionic conductivity may decrease. For similar reasons, in usual, it is preferable that at least one of R$^{21}$ and R$^{22}$ is a straight chain, and it is more preferable that each of R$^{21}$ and R$^{22}$ is a straight chain. For instance, it is preferable to use a fluorinated acyclic carbonate in which each of R$^{21}$ and R$^{22}$ is a fluoroalkyl group with each containing a total of one or two carbon atom(s).

Specific examples of the fluorinated acyclic carbonate represented by the formula (C2) include fluoromethyl methyl carbonate, difluoromethyl methyl carbonate, trifluoromethyl methyl carbonate, fluoromethyl difluoromethyl carbonate, bis(fluoromethyl) carbonate, bis(difluoromethyl) carbonate, bis(trifluoromethyl) carbonate, 2-fluoroethyl methyl carbonate, ethyl fluoromethyl carbonate, 2,2-difluoroethyl methyl carbonate, 2-fluoroethyl fluoromethyl carbonate, ethyl difluoromethyl carbonate, 2,2,2-trifluoroethyl methyl carbonate, 2,2-difluoroethyl fluoromethyl carbonate, 2-fluoroethyl difluoromethyl carbonate, ethyl trifluoromethyl carbonate, ethyl 2-fluoroethyl carbonate, ethyl 2,2-difluoroethyl carbonate, bis(2-fluoroethyl) carbonate, ethyl 2,2,2-trifluoroethyl carbonate, 2,2-difluoroethyl 2'-fluoroethyl carbonate, bis(2,2-difluoroethyl) carbonate, 2,2,2-trifluoroethyl 2'-fluoroethyl carbonate, 2,2,2-trifluoroethyl 2',2'-difluoroethyl carbonate, bis(2,2,2-trifluoroethyl) carbonate, pentafluoroethyl methyl carbonate, pentafluoroethyl fluoromethyl carbonate, pentafluoroethyl ethyl carbonate, bis (pentafluoroethyl) carbonate, and the like.

The amount of the fluorinated carbonate is preferably, for instance, 5% by volume or more (e.g. 10% by volume or more, typically 20% by volume or more) of all components in the non-aqueous electrolyte solution excluding the supporting salt (or "non-supporting-salt components" hereinafter). Essentially 100% by volume (typically 99% by volume or more) of the non-supporting-salt components may be a fluorinated carbonate. Usually, from the standpoint of reducing the viscosity of the non-aqueous electrolyte solution or increasing its ion conductivity, the amount of fluorinated carbonate in the non-supporting-salt components is preferably 90% by volume or less (e.g. 70% by volume or less, typically 60% by volume or less).

Other preferable examples include a non-aqueous electrolyte solution comprising a non-aqueous solvent that comprises a dialkyl carbonate whose alkyl group has 1 to 4 carbon atoms (e.g. EMC) and a fluorinated carbonate (e.g. MFEC), wherein their volume ratio is 1:9 to 9:1 (e.g. 3:7 to 7:3, typically 4:6 to 6:4) and their combined amount accounts for 50% by volume or more (e.g. 70% by volume or more, typically 90% by volume or more, but 100% by volume or less) of the non-supporting-salt components.

As the supporting salt, for example, can be used one, two or more species of lithium compounds (lithium salts) such as $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, LiI and the like. The supporting salt concentration is not particularly limited while it can be about 0.1 mol/L to 5 mol/L (e.g. 0.5 mol/L to 3 mol/L, typically 0.8 mol/L to 1.5 mol/L).

The non-aqueous electrolyte may comprise optional additives as necessary to an extent not significantly impairing the objectives of the present invention. The additive may be used so as to increase the battery's output performance, to increase the shelf life (to inhibit a capacity decrease during storage, etc.), to bring about greater cycle characteristics, to increase the initial charging and discharging efficiencies, and so on. Examples of preferable additives include a fluorophosphate (preferably a difluorophosphate, e.g. lithium difluorophosphate represented by $LiPO_2F_2$) and lithium bis(oxalato)borate (LiBOB). Alternatively, for instance, can be used additives such as cyclohexylbenzene, biphenyl and the like which are applicable in dealing with overcharges.

<Vehicle>

Figure 8:
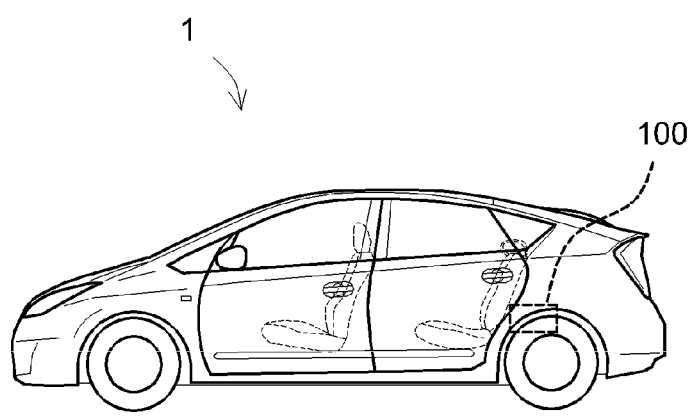
FIG. 8 shows a side view schematically illustrating a vehicle (automobile) comprising a lithium secondary battery according to an embodiment.

In a lithium secondary battery thus constructed, the metal dissolved out from the positive electrode is inhibited from precipitating out on the negative electrode, whereby battery capacity reduction is suppressed. Thus, it can be used as a secondary battery for various purposes. For example, as shown in FIG. 8, a lithium secondary battery 100 can be installed in a vehicle 1 such as an automobile, etc., and preferably used as a power supply for a drive source such as a motor and the like to drive the vehicle 1. The present invention can provide a vehicle (typically an automobile, particularly an automobile comprising an electric motor such as a hybrid vehicle (HV), plug-in hybrid vehicle (PHV), electric vehicle (EV) and fuel cell vehicle) 1 comprising, as its power source, the lithium secondary battery (typically a battery system comprising several series-connected batteries) 100.

Several worked examples relating to the present invention are described below, but the present invention is not intended to be limited to these examples. In the description below, "parts" and "%" are by mass unless otherwise specified.

Example 1

Fabrication of Positive Electrode Sheet

With NMP, were mixed a spinel lithium nickel manganese composite oxide ($LiNi_{0.5}Mn_{1.5}O_4$) as a positive electrode active material, acetylene black as a conductive material and PVdF as a binder at a mass ratio of these materials of 85:10:5 to prepare a paste-like positive electrode material layer-forming composition. The composition was evenly applied to each face of aluminum foil (positive current collector, 15 μm thick) to a combined coating amount of 30 mg/cm² (based on non-volatiles), dried, and then pressed to fabricate a positive electrode in a sheet form (positive electrode sheet). The positive electrode material layer had a density of 2.8 g/cm³.

[Fabrication of Negative Electrode Sheet]

With ion-exchanged water, were mixed graphite powder as a negative electrode active material, PVdF as a binder and carboxymethyl cellulose (CMC) as a thickener at a mass ratio of these materials of 98:1:1 to prepare a paste-like negative electrode material layer-forming composition. The composition was evenly applied to copper foil (14 μm thick) to a coating amount of 17 mg/cm² (based on non-volatiles), dried, and then pressured to fabricate a negative electrode in a sheet form (negative electrode sheet). The negative electrode material layer had a density of 1.4 g/cm³.

[Fabrication of LTO Layer-Containing Separator Sheet]

As a separator sheet, was obtained a three-layer separator sheet (20 μm thick) formed of PP/PE/PP. As for the thickness of the respective layers, each PP layer was 7 μm thick while the PE layer was 6 μm thick. An LTO layer was formed on one face of the separator sheet. More specifically, lithium titanate (LTO: $Li_4Ti_5O_{12}$) and PVdF were mixed at a mass ratio of 95:5 with NMP to prepare a slurry LTO layer-forming composition. Mixing was carried out with an ultrasonic disperser "Clearmix" available from M Technique Co., Ltd. The resulting LTO layer-forming composition was applied by a gravure coating method to entirely cover one face of the separator sheet, and allowed to dry at a temperature of 70° C. to form an LTO layer. An LTO layer-containing separator sheet having a 10 μm thick LTO layer formed on one face was thus fabricated.

[Construction of Lithium Secondary Battery]

The positive electrode sheet and negative electrode sheet prepared above were cut out to 4.4 cm squares each having a tab portion, the material layers were scraped off the tab portions and lead lines each having a sealing portion were attached thereto. One layer of the positive electrode sheet was layered with two layers of the negative electrode sheet via two LTO layer-containing separator sheets. Each LTO layer-containing separator sheet was placed so as to face the positive electrode sheet. In such a way, was fabricated an electrode body having a constitution with a cross section from the positive electrode through a negative electrode as illustrated in FIG. 4. The electrode body was placed in an aluminum-laminated bag and a non-aqueous electrolyte solution was injected thereto. As the non-aqueous electrolyte solution, was used an electrolyte solution obtained by dissolving about 1 mol/L of $LiPF_6$ as a supporting salt in a solvent mixture of monofluoroethylene carbonate (MFEC) and ethyl methyl carbonate (EMC) at 1:1 (volume ratio). While evacuating the bag, the aluminum-laminated film and the sealing portions on the lead lines were thermally welded to close (seal) the inside, whereby a laminated cell was fabricated.

Example 2

In addition to the LTO layer-containing separator sheet, a single-layer separator sheet (10 μm thick) formed of PE was obtained. The LTO layer-containing separator sheet and LTO layer-free separator sheet were layered between the positive electrode sheet and the respective negative electrode sheet. For this, each LTO layer-containing separator sheet was placed so that the LTO layer faced the adjacent LTO layer-free separator sheet. Otherwise, in the same manner as Example 1, was fabricated an electrode body having a constitution with a partial cross section from the positive electrode through the negative electrode as illustrated in FIG. 5. Other than this electrode body being used, in the same manner as Example 1, was fabricated a laminated cell according to Example 2.

Example 3

The LTO layer-containing separator sheets were placed so that the LTO layer faced the negative electrode sheets, respectively. Otherwise, in the same manner as Example 1, was fabricated a laminated cell according to Example 3.

Example 4

As the separator sheet, a PP/PE/PP three-layer separator sheet (20 μm thick) was substituted for the LTO layer-containing separator sheet. Otherwise, in the same manner as Example 1, was fabricated a laminated cell according to Example 4.

<Evaluation of Properties>
[Durability Test]

At a temperature of 25° C., each cell was subjected to three cycles of constant current (CC) charging at a ⅓ C rate to 4.9 V followed by a 10 minute break and CC discharging at the ⅓ C rate to 3.5 V followed by 10 minute break (conditioning). The discharge capacity during the third cycle was measured and recorded as the initial capacity (initial discharge capacity) (initial capacity measurement).

Subsequently, the battery was left standing in a thermostatic bath set at a temperature of 60° C. for two hours or longer, and then subjected to 200 cycles of the following charging and discharging operations (1) to (4) (durability test):

(1) CC charging at a 2 C rate to 4.9 V
(2) 10 minute break
(3) CC discharging at the 2 C rate to 3.5 V
(4) 10 minute break After 50 cycles, 100 cycles and 200 cycles, the discharge capacity was measured by the same method as the initial capacity (measurement of cycle capacities). The capacity retention rates (%) were determined as ratios of the respective cycle capacities (after 50 cycles, 100 cycles, 200 cycles) to initial capacities ((each cycle capacity/initial capacity)× 100(%)). The values (capacity retention rates) obtained were converted to relative values with the value of Example 4 being 100. The results are shown in FIG. 6.

[Quantification of Manganese]

Figure 7:
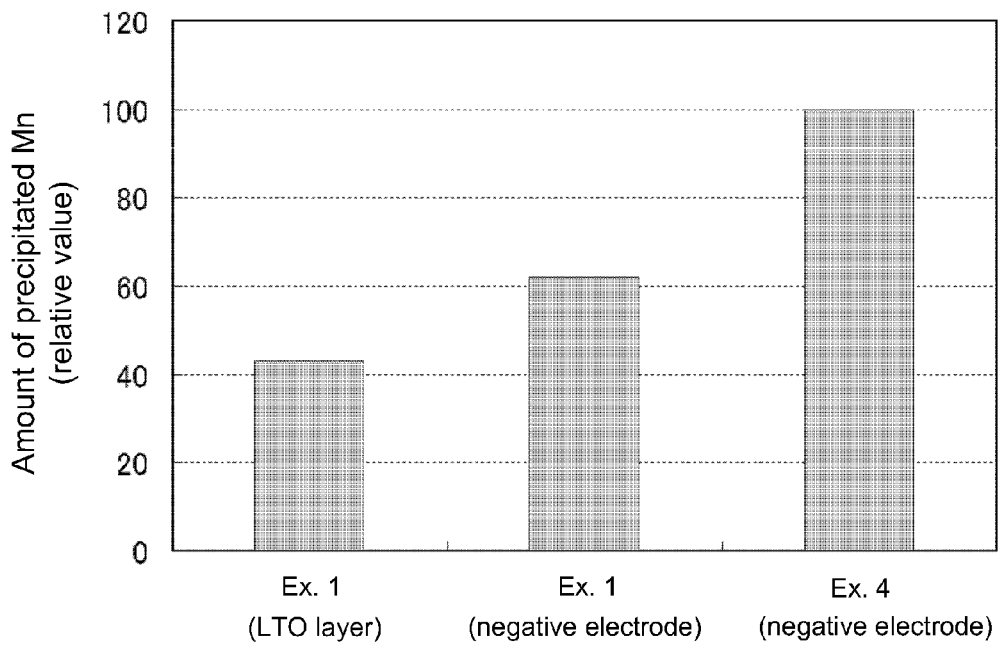
FIG. 7 shows a plot of quantities of manganese (Mn) precipitate after durability test.

After the durability test, the laminated cells according to Example 1 and Example 4 were disassembled. The negative electrode sheets of Example 1 and Example 4 as well as the LTO layer-containing separator sheets of Example 1 were collected and subjected to quantificational analysis of manganese (Mn) precipitated on the negative electrode sheets and LTO layers. In particular, the collected negative electrode sheets and LTO layers were washed with the non-aqueous solvent used in the non-aqueous electrolyte solution two to three times, and punched out to arbitrary dimensions to obtain measurement samples for inductively coupled plasma atomic emission spectroscopy (ICP-AES) analysis. Each sample was dissolved with heat in an acidic solvent (sulfuric acid was used here). The resulting solution was analyzed by ICP-AES to measure the amount (μg) of Mn atoms. The measured values were converted to relative values with the Mn quantity in the negative electrode sheet of Example 4 being 100. The results are shown in FIG. 7.

Figure 6:
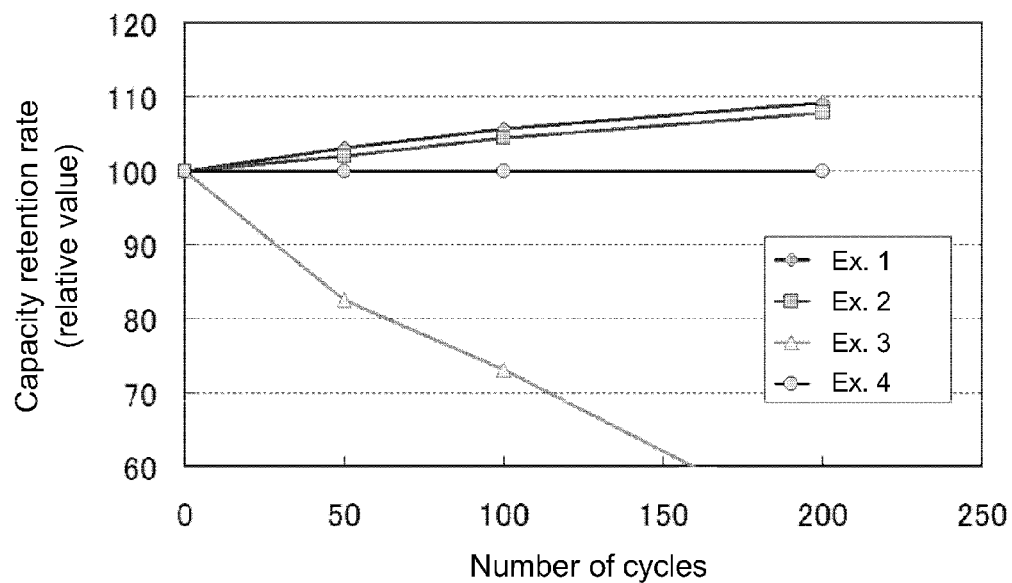
FIG. 6 shows a graph representing relationships between capacity retention rate vs. number of cycles in durability test.

As shown in FIG. 6, with respect to Example 1 and Example 2 having LTO layers isolated from negative electrode inside the electrode bodies, the capacity retention rate increased as compared to Example 4 free of an LTO layer. On the other hand, with respect to Example 3 having LTO layers in contact with negative electrodes, the capacity retention rate showed a significant fall. While it is unnecessary to reveal the reasons behind this, it is presumed that due to the contact between the LTO layers and negative electrodes, the LTO layer's potential dropped as low as the negative electrode level; and Li was absorbed into the LTO layers, causing the capacity loss. As shown in FIG. 7, the quantity of Mn precipitated on the negative electrode in Example 1 was lower than that in Example 4 while the combined quantity of Mn precipitate for the negative electrodes and LTO layers in Example 1 was similar to the quantity of Mn precipitate in the negative electrodes of Example 4. In other words, in Example 1, Mn precipitation at the LTO layer increased corresponding to the decrease in Mn precipitation at the negative electrode. From these results, it can be found that in Example 1, a certain amount of Mn dissolved out from the positive electrode was captured by the LTO layers, reducing Mn precipitation by the same amount on the negative electrodes. Presumably, this resulted in inhibition of battery capacity reduction caused by metal precipitation on the negative electrode.

Although specific embodiments of the present invention have been described in detail above, these are merely for illustrations and do not limit the scope of the claims. The invention disclosed herein includes various modifications and changes made to the specific embodiments illustrated above.

REFERENCE SIGNS LIST

1 automobile (vehicle)
10 battery case
12 opening
14 lid
20 wound electrode body
25 non-aqueous electrolyte solution
30 positive electrode (positive electrode sheet)
32 positive current collector
34 positive electrode material layer
35 positive current collector-overlapping portion
36 positive electrode material layer-free portion
37 inner positive terminal
38 outer positive terminal 40 negative electrode (negative electrode sheet)
42 negative current collector
44 negative electrode material layer
45 negative current collector-overlapping portion
46 negative electrode material layer-free portion
47 inner negative terminal
48 outer negative terminal
50A, 50B, 50a, 50b separators (separator sheets)
51 lithium titanate-containing layer (LTO layer)
100 lithium secondary battery

The invention claimed is:

1. A non-aqueous electrolyte secondary battery that comprises an electrode body comprising a positive electrode and a negative electrode, wherein
the positive electrode has an operating voltage of 4.5 V to 5.5 V relative to lithium metal,
the electrode body comprises a lithium titanate-containing layer comprising lithium titanate and a binder, the lithium titanate-containing layer being isolated from the negative electrode,
the lithium titanate-containing layer has a thickness of 5 µm to 15 µm, and
the lithium titanate-containing layer is placed between the positive electrode and the negative electrode,
wherein a separator is placed between the positive electrode and the negative electrode, and the lithium titanate-containing layer is provided above the positive electrode side surface of the separator.

2. The non-aqueous electrolyte secondary battery according to claim 1, wherein the positive electrode comprises, as a positive electrode active material, a spinel lithium transition metal composite oxide, the lithium transition metal composite oxide comprising at least nickel and manganese as transition metals.

3. The non-aqueous electrolyte secondary battery according to claim 1, wherein a content of lithium titanate in the lithium titanate-containing layer is 50% by mass to 99.5% by mass.

4. The non-aqueous electrolyte secondary battery according to claim 1, wherein the non-aqueous electrolyte secondary battery comprises a non-aqueous electrolyte solution containing a fluorinated carbonate.

5. A vehicle comprising the non-aqueous electrolyte secondary according to claim 1.

6. The non-aqueous electrolyte secondary battery according to claim 1, wherein the binder is selected from the group consisting of acrylic resin, rubber, polyolefin-based resin, cellulose-based polymer, polyvinyl alcohol, fluorine-based resin, vinyl acetate polymer and polyalkylene oxide.

7. The non-aqueous electrolyte secondary battery according to claim 1, wherein the binder is selected from the group consisting of acrylic resin, styrene-butadiene rubber, polyolefin-based resin and carboxymethyl cellulose.

8. The non-aqueous electrolyte secondary battery according to claim 1, wherein the binder comprises a polymer that is dispersible or soluble in an aqueous solvent.

9. The non-aqueous electrolyte secondary battery according to claim 1, wherein the binder is selected from the group consisting of halogenated vinylic resin, polytetrafluoroethylene, polyacrylonitrile, and polymethyl methacrylate.

10. The non-aqueous electrolyte secondary battery according to claim 1, wherein the binder comprises a polymer that is dispersible or soluble in an organic solvent.

* * * * *